(12) United States Patent
Veprinsky et al.

(10) Patent No.: US 9,910,620 B1
(45) Date of Patent: Mar. 6, 2018

(54) METHOD AND SYSTEM FOR LEVERAGING SECONDARY STORAGE FOR PRIMARY STORAGE SNAPSHOTS

(71) Applicant: EMC Corporation, Hopkinton, MA (US)

(72) Inventors: Alexandr Veprinsky, Brookline, MA (US); Assaf Natanzon, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 40 days.

(21) Appl. No.: 15/086,577

(22) Filed: Mar. 31, 2016

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |

(52) U.S. Cl.
CPC ............ *G06F 3/065* (2013.01); *G06F 3/0619* (2013.01); *G06F 3/0652* (2013.01); *G06F 3/0683* (2013.01)

(58) Field of Classification Search
CPC ............ G06F 3/00; G06F 3/06–3/0617; G06F 3/0619; G06F 3/0623; G06F 3/0628–3/065; G06F 3/0652; G06F 3/0668–3/0682; G06F 3/0683; G06F 3/0685–3/0689; G06F 11/00; G06F 11/14; G06F 11/1402–11/1474; G06F 11/20–11/2056; G06F 11/2058–11/2097; G06F 17/30; G06F 17/30067–17/30238; G06F 2003/0691–2003/0698; G06F 2201/00–2201/885; G06F 2206/00–2206/1014; G06F 2211/00–2211/902; G06F 2212/00–2212/7211; G06F 2216/00–2216/17
See application file for complete search history.

(56) References Cited

U.S. PATENT DOCUMENTS

| | | | | |
|---|---|---|---|---|
| 7,546,431 | B2 * | 6/2009 | Stacey | G06F 17/30067 707/999.104 |
| 7,603,532 | B2 * | 10/2009 | Rajan | G06F 3/0608 707/999.202 |
| 8,230,192 | B2 * | 7/2012 | Balasubramanian | ... G06F 3/061 711/162 |
| 8,452,932 | B2 * | 5/2013 | Pangal | G06F 11/1453 711/162 |
| 8,458,421 | B2 * | 6/2013 | Eguchi | G06F 3/0608 711/161 |
| 8,464,101 | B1 * | 6/2013 | Natanzon | G06F 11/2064 714/38.1 |
| 8,769,055 | B2 * | 7/2014 | Murphy | G06F 11/1451 707/634 |
| 8,775,751 | B1 * | 7/2014 | Pendharkar | G06F 3/0608 707/649 |
| 8,984,221 | B2 * | 3/2015 | Satoyama | G06F 3/0605 711/114 |

(Continued)

*Primary Examiner* — Daniel C Chappell

(57) ABSTRACT

Example embodiments of the present invention relate to a method, a system, and a computer program product for leveraging secondary storage for primary storage snapshots. The method includes creating a current first snapshot of a volume at a current first time in a primary storage. The method then may determine differences between the current first snapshot at the current first time and a previous second snapshot created at a previous second time. The differences then may be sent to a secondary storage.

12 Claims, 6 Drawing Sheets

(56) References Cited

U.S. PATENT DOCUMENTS

| | | | |
|---|---|---|---|
| 8,996,490 B1* | 3/2015 | Armangau | G06Q 30/02 707/705 |
| 9,009,106 B1* | 4/2015 | Aron | G06F 11/14 707/610 |
| 9,026,498 B2* | 5/2015 | Kumarasamy | G06F 17/30079 707/652 |
| 9,069,482 B1* | 6/2015 | Chopra | G06F 3/065 |
| 9,176,679 B2* | 11/2015 | Oberhofer | G06F 3/061 |
| 9,323,462 B2* | 4/2016 | Olson | G06F 3/0619 |
| 9,423,962 B1* | 8/2016 | Basham | G06F 12/0868 |
| 9,519,439 B2* | 12/2016 | Sundarrajan | G06F 3/065 |
| 9,594,514 B1* | 3/2017 | Bono | G06F 12/00 |
| 9,613,040 B2* | 4/2017 | Olson | G06F 17/30088 |
| 9,632,724 B1* | 4/2017 | Beeken | G06F 3/0619 |
| 2016/0034481 A1* | 2/2016 | Kumarasamy | G06F 17/30088 707/639 |

\* cited by examiner

US 9,910,620 B1

METHOD AND SYSTEM FOR LEVERAGING SECONDARY STORAGE FOR PRIMARY STORAGE SNAPSHOTS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATION

This Application is related to U.S. patent application Ser. No. 14/751,652 entitled "TIERING DATA BETWEEN TWO DEDUPLICATION DEVICES" filed on Jun. 26, 2015 and Ser. No. 14/871,344 entitled "METHOD AND SYSTEM FOR MULTI-TIER ALL-FLASH ARRAY" filed on Sep. 30, 2015, both of which applications are assigned to EMC Corporation of Hopkinton, Mass., the teachings of which applications are hereby incorporated herein by reference in their entirety.

TECHNICAL FIELD

This application relates to data storage.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

SUMMARY

Example embodiments of the present invention relate to a method, a system, and a computer program product for leveraging secondary storage for primary storage snapshots. The method includes creating a current first snapshot of a volume at a current first time in a primary storage. The method then may determine differences between the current first snapshot at the current first time and a previous second snapshot created at a previous second time. The differences then may be sent to a secondary storage.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
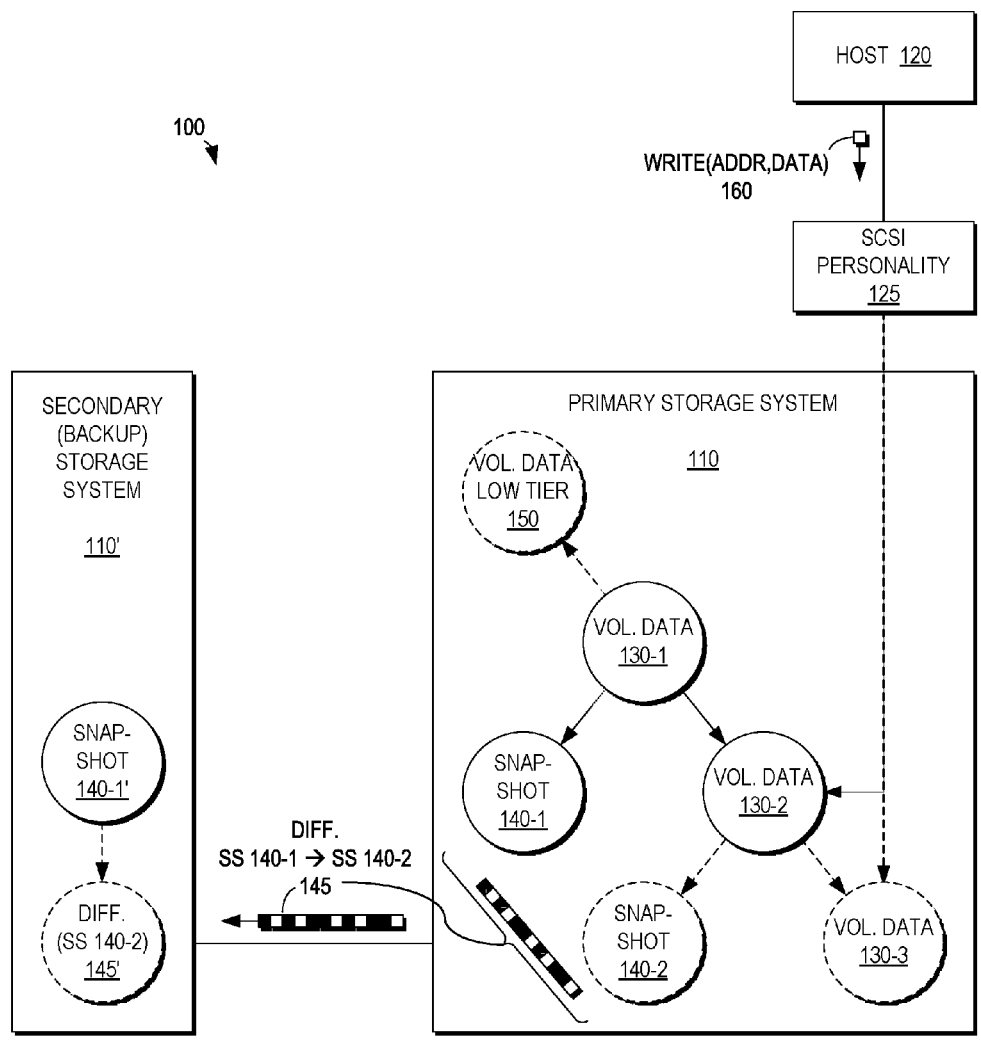
FIG. 1 is a block diagram illustrating a system for leveraging secondary storage for primary storage snapshots according to an example embodiment of the present invention.
Figure 3:
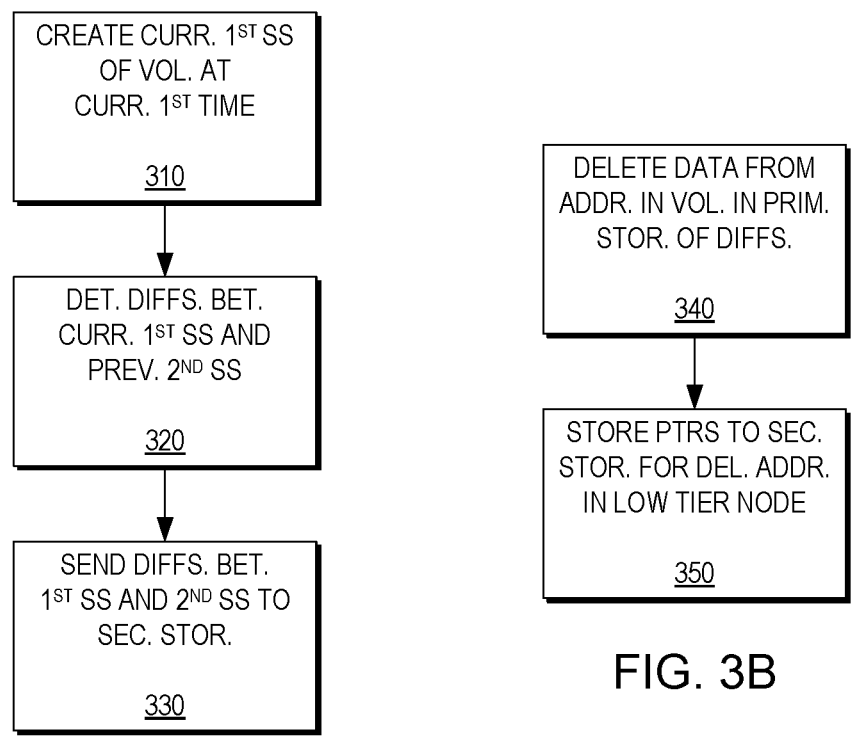
FIGS. 3A-3B are flow diagrams illustrating methods for leveraging secondary storage for primary storage snapshots according to respective example embodiments of the present invention.

FIG. 1 is a block diagram illustrating a system 100 for leveraging secondary storage 120 for primary storage 110 snapshots 140-1, 140-2 (140 generally) according to an example embodiment of the present invention. FIGS. 3A-3B are flow diagrams illustrating methods for leveraging secondary storage for primary storage snapshots according to respective example embodiments of the present invention. FIGS. 1 and 3A-3B may be described in conjunction.

As illustrated in FIG. 1, a data storage system may include a primary storage system 110 communicatively coupled to a host 120. The primary storage system 110 also may be communicatively coupled to a secondary storage system 110' (e.g., a backup storage system). The primary storage system 110 of FIG. 1 stores a volume represented as a tree of nodes (e.g., volume data nodes 130-1, 130-2, 130-3 (130 generally), with the first and second volume data nodes 130-1, 130-2 being frozen (i.e., not writable) images of the volume, and snapshot nodes 140-1, 140-2 (140 generally)).

In certain embodiments, the primary storage system 110 may be an EMC® XtremIO® array by EMC Corporation of Hopkinton, Mass. In certain embodiments, the secondary storage system 110' may be a Data Domain® data protection device by EMC Corporation of Hopkinton, Mass. In certain embodiments, the secondary storage system 110' (e.g., Data Domain) may be a virtual (i.e., software) instance running (e.g., as a virtual machine) on the primary storage system 110 (e.g., XtremIO) to provide, for example, relatively low latency reads even for rarely accessed data sets. However, it should be understood that example embodiments of the present invention are equally applicable to standalone data storage systems 110, 110'. The volume data is represented as a series of nodes 130 each containing the differences from its parent data node 130. When creating a snapshot, a new volume data node 130 is created that is initially empty, as described in U.S. Pat. No. 9,141,290 entitled "SNAPSHOT MECHANISM" and assigned to EMC Corporation of Hopkinton, Mass., the teachings of which patent are incorporated herein by reference in their entirety.

The host 120 may access the volume data nodes 130 according to a Small Computer System Interface (SCSI) personality 125 visible to the host 120 and linked to a current volume data node 130 to enable access to a point in time. The SCSI personality 125 may be moved to other volume data nodes 130 in the tree. In other words, the primary storage system 110 maintains a tree of volume data nodes 130 and snapshots 140, where every node in the tree represents the differences between that node and the node's parent. When a user chooses to access a given point-in-time, a "snap and reassign" operation is performed on the selected snapshot and the application host can now access the device.

For simplicity, the following description will describe only one volume; however, it should be understood that the methods described herein are equally applicable to data storage systems 100 storing a plurality of volumes.

As illustrated in FIG. 1, in an initial state, there are volume data nodes 130-1, 130-2 with the SCSI personality 125 pointing to the latest (second) volume data node 130-2. Further, there is a first snapshot 140-1 representing the volume at a first point in time which has been replicated to the secondary storage system 110'. The primary storage system, 110 may create a second snapshot 140-2 from the volume data node 130-2 representing the volume at a second point in time and create a third volume data node 130-3 from the second volume data node 130-2 and move the SCSI personality from the parent (second) volume data node 130-2 to the child (third) volume data node 130-3. It should be understood that the primary storage system 110 may create new snapshots periodically (e.g., daily, x hours, etc.).

Accordingly, when the primary storage system 110 creates the snapshot 140-2 of the second volume data node 130-2 (i.e., device), there are two entities created: (1) a snapshot 140-2 which is a version of the volume data 130-2 (i.e., a writable snapshot that points to the volume), and (2) a third volume data node 130-3 which is assigned the SCSI personality 125. Therefore, the third volume data node 130-3 can get new changes (e.g., write 160) to the volume 130 which now becomes fixed (i.e., when a snapshot is taken, the child (third) volume data node 130-3 is created and the parent (second) volume data node 130-2 becomes fixed with no more changes). It should be understood that the parent (second) volume data node 130-2 is the same as the data in the second snapshot 140-2 before and input/output (I/O) operations are performed on it. The child (third) volume data node 130-3 is assigned the SCSI personality so it receives the I/Os from the host 120.

As illustrated in FIG. 1 and FIG. 3A, the primary storage system 110 may create the second (i.e., current) snapshot 140-2 of the volume at a current time (310). Further, the primary storage system 110 then may determine the difference 145 between the second (i.e., current) snapshot 140-2 at the current time and a first (i.e., previous) snapshot 140-1 created at a previous time (320) (i.e., the latest snapshot shipped to the secondary storage system 110'). In certain embodiments, taking the difference 145 may product a bitmap of the changes between the two snapshots 140-1, 140-2. The difference 145 may be shipped to the secondary storage system 110' (330) and stored 145' at the secondary storage system 110'.

As illustrated in FIGS. 1 and 3B, once the second snapshot 140-2 (via the differences 145) is shipped to the secondary storage system 110', example embodiments of the present invention may decide when volume data should be kept on the primary storage system 110. For example, the primary storage system 110 may determine (e.g., according to a heatmap) that frequently accessed data should remain on the primary storage system 110 which data that is not read frequently may be erased from the snapshot 140-2 (340). In certain embodiments, a punch command may be used to delete data from snapshots 140 as described in greater detail in U.S. patent application Ser. No. 15/084,810 filed on Mar. 30, 2016 and assigned to EMC Corporation of Hopkinton, Mass., the teachings of which are incorporated herein by reference in their entirety.

Therefore, in example embodiments in which the primary storage system 110 is, for example, flash storage (i.e., expensive), data storage cost may be reduced by reducing storing infrequently-accessed data to expensive storage media by tiering the infrequently-accessed data to more traditional data storage media in the secondary storage system 110'. The primary storage system 110 then may create a low tier pointer data structure 150 that, for example, contains pointers for deleted data that is stored in the secondary storage system 110'.

Figure 2:
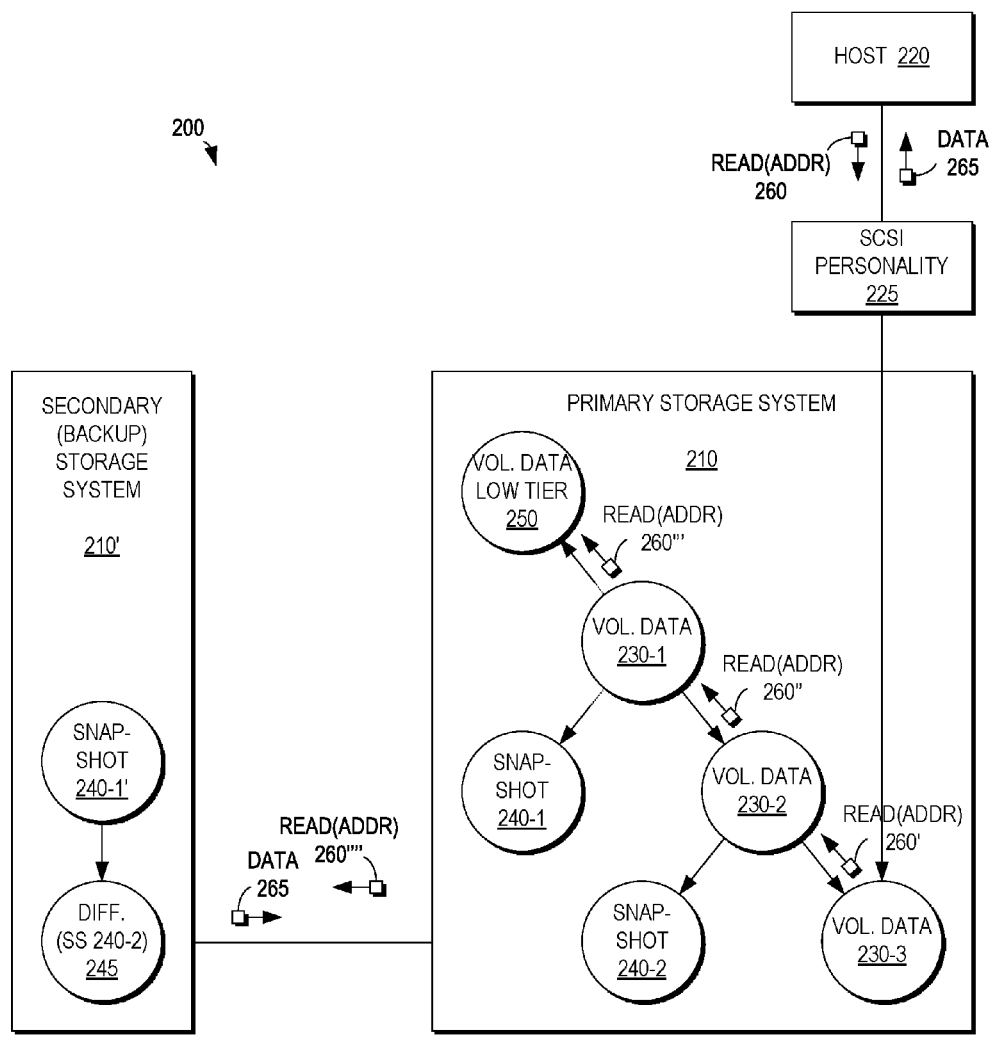
FIG. 2 is a block diagram illustrating performing a read operation on a system for leveraging secondary storage for primary storage snapshots according to an example embodiment of the present invention.
Figure 4:
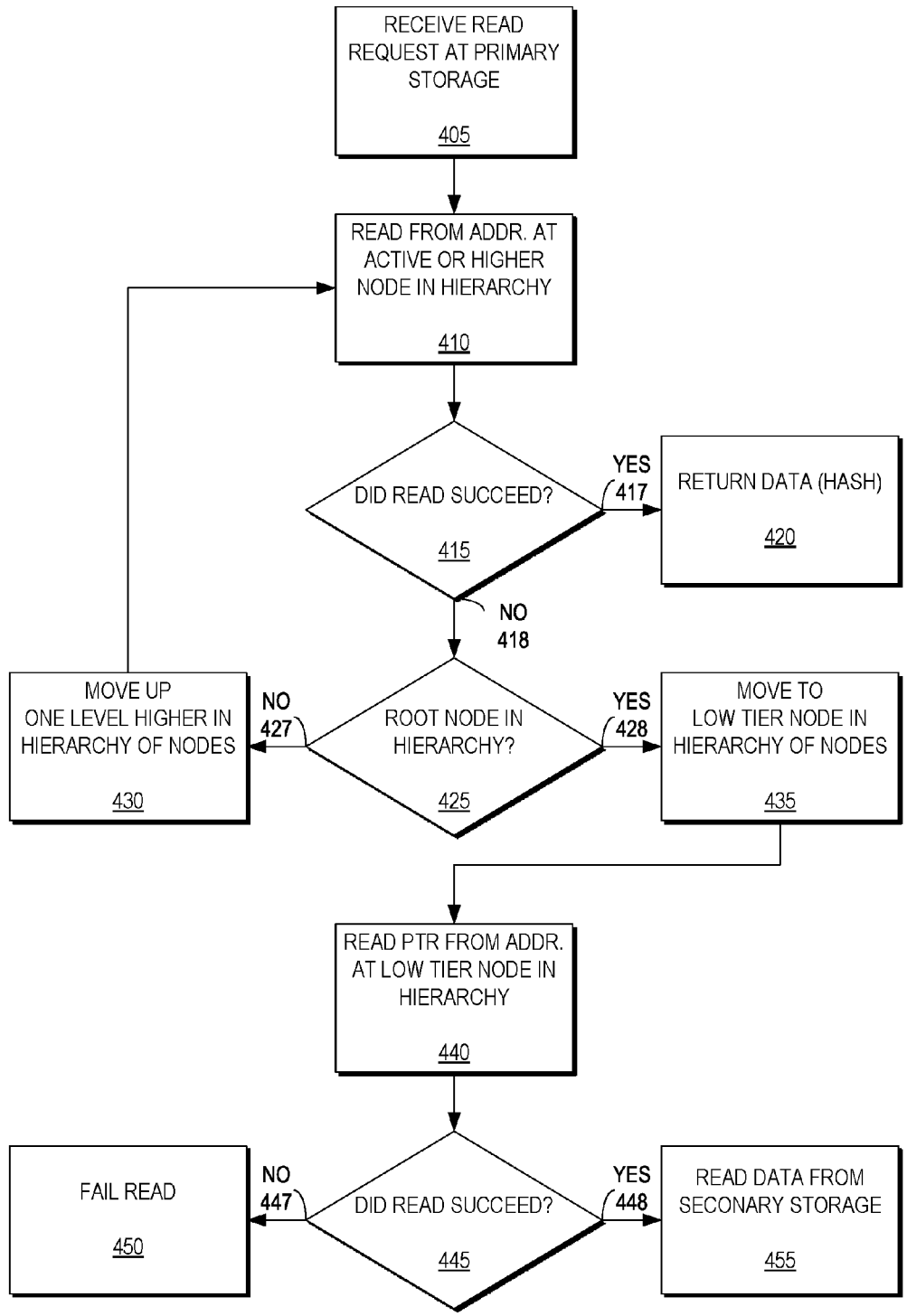
FIG. 4 is a flow diagram illustrating a method for performing a read operation on a system for leveraging secondary storage for primary storage snapshots according to an example embodiment of the present invention.

FIG. 2 is a block diagram illustrating performing a read operation 260 on a system 200 for leveraging secondary storage 210' for primary storage 210 snapshots 240 according to an example embodiment of the present invention. FIG. 4 is a flow diagram illustrating a method for performing a read operation 260 on a system 200 for leveraging secondary storage 210' for primary storage 210 snapshots 240 according to an example embodiment of the present invention. FIGS. 2 and 4 may be described in conjunction.

As illustrated in FIGS. 2 and 4, the primary storage system 210 may receive a read I/O 260 including a read address (405) and recursively attempt to read the data from the read address from an active or a higher level volume data node 230 in a hierarchy of volume data nodes 230 storing data for the volume at the primary storage system 210 (410).

The method then may determine whether the read 260 on the third volume data node 230-3 was successful (415). If the read 260 on the third volume data node 230-3 was successful (417), the method may return the read request data (420). In certain embodiments, as described below, the read operation 260 may return a hash value indicative of a physical location the requested data is stored.

If the read 260 on the third volume data node 230-3 was not successful (418) (i.e., the read area is thin), the method then determines whether the third volume data node 230-3 on which the read 260 was performed is the root volume data node 230 in the hierarchy of volume data nodes 230 (425). Here, in the example of FIG. 2, the third volume data node 230-3 is not the root node in the hierarchy (427), so the method moves up one level higher (i.e., to the parent node) in the hierarchy of volume data nodes 230 (430) and the primary storage system 210 attempts to read 260' the data from the second volume data node 230-2 (410).

The method then may determine whether the read 260' on the second volume data node 230-2 was successful (415). If the read 260' on the second volume data node 230-2 was successful (417), the method may return the read request data (420).

If the read 260' on the second volume data node 230-2 was not successful (418) (i.e., the read area is thin), the method then determines whether the second volume data node 230-2 on which the read 260' was performed is the root volume data node 230 in the hierarchy of volume data nodes 230 (425). Here, in the example of FIG. 2, the second volume data node 230-2 is not the root node in the hierarchy (427), so the method moves up one level higher (i.e., to the parent node) in the hierarchy of volume data nodes 230 (430) and the primary storage system 210 attempts to read 206" the data from the first volume data node 230-1 (410).

The method then may determine whether the read 260" on the first volume data node 230-1 was successful (415). If the read 260" on the first volume data node 230-1 was successful (417), the method may return the read request data (420).

If the read 260" on the first volume data node 230-1 was not successful (418) (i.e., the read area is thin), the method then determines whether the first volume data node 230-1 on which the read 260" was performed is the root volume data node 230 in the hierarchy of volume data nodes 230 (425). Here, in the example of FIG. 2, the first volume data node 230-1 is the root node in the hierarchy (428), so the method moves to the low tier pointer data structure 250 (435) in the hierarchy and the primary storage system 210 attempts to read 206''' the data (e.g., a pointer to the secondary storage system 210') from the low tier pointer data structure 250 (440).

The method then may determine whether the read 260' on the low tier pointer data structure 250 was successful (445). If the read 260''' was not successful (447), the primary data storage system 210 may fail the read 260''' (450). However, if the read 260' was successful (448), the primary storage system 210 may perform a read 260''' on the secondary storage system 210' (455) according to the pointer returned by the read 260' performed against the low tier pointer data structure 250. The secondary storage system 210' then may respond to the read 260' by providing the requested data 265.

It should be understood that in example embodiments of the present invention there may be two different types of metadata stored in the nodes 230, 250: (1) a first metadata type indicative of the volume data node 230 being thin for the requested read address; and (2) a second metadata type in the low tier pointer data structure 250 indicative of the requested data being tiered from the primary storage system 210 to the secondary storage system 210'.

As described in U.S. patent application Ser. No. 14/751, 652 incorporated by reference above, in certain embodiments the primary storage system 210 may save each block of data according to a hash. In one particular example, the blocks of data are 8 KB in size. In one particular example, a hash includes a Secure Hash Algorithm 1 (SHA-1) hash. In one example, the primary storage system 210 may be a deduplicated storage array so that each of the data in the data storage system may be kept in separate levels.

Accordingly, in such examples, in a first level, each volume may include a set of pointers from address-to-hash value of the data address (e.g., in an address-to-hash (A2H) mapping). Further, in such examples, a second level of mapping includes, for example, a map from hash-to-the physical location (e.g., in a hash-to-physical (H2P) mapping) where the data matching the hash value is stored. In some examples, A2H mappings and H2P mappings may each be maintained using one or more tables. It will be appreciated that, in certain embodiments, combinations of the A2H and H2P tables may provide multiple levels of indirection between the logical (i.e., I/O) address used to access data and the physical address where that data is stored. Among other advantages, this may allow the primary storage system 210 freedom to move data within the storage (i.e., physical storage media (e.g., disks, solid state drives (SSDs), etc.).

Further, in embodiments using A2H and H2P tables, the hash values need not be retained, thereby reducing the metadata overhead in the primary storage system 210, because the low tier pointer data structure 250 provides a pointer to the data, itself, in the secondary storage system 210'.

It should be understood that the read flow for a tiered volume according to an example embodiment of the present invention will be identical to reading from a volume which has a snapshot on the primary storage 210 (e.g., as described in U.S. Pat. No. 9,141,290 incorporated by reference above), but if the requested 260 data in the volume 230 is nonexistent (i.e. sparse data), the method checks the secondary snapshot low tier structure 250 (i.e., whether the location in the snapshot 240 is indeed thin or if there is a pointer to the secondary storage system 210').

Figure 5:
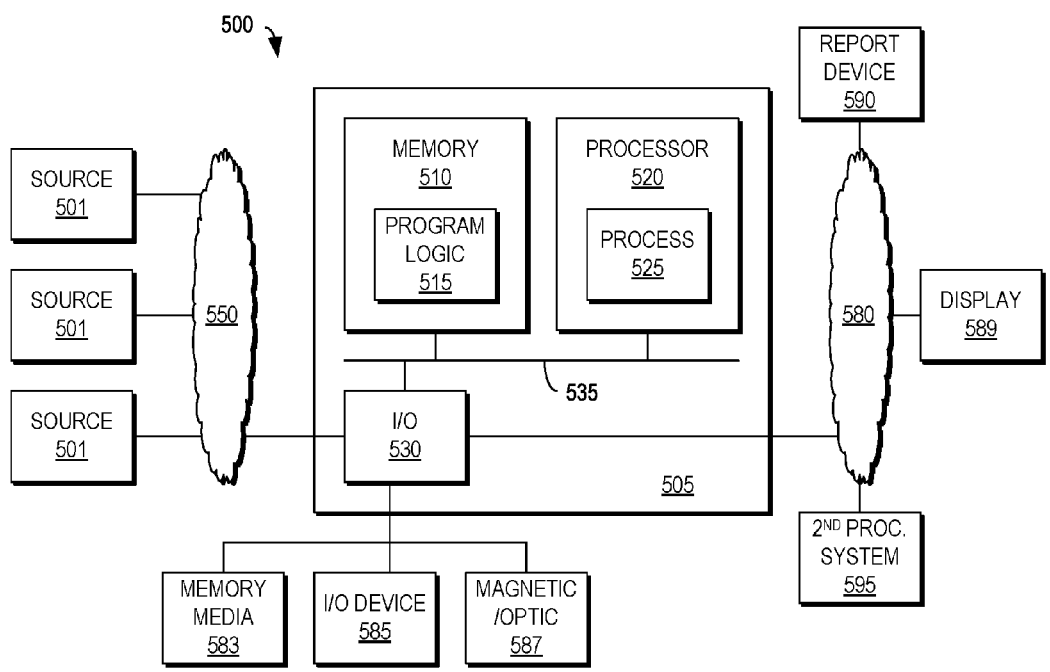
FIG. 5 is a block diagram illustrating an apparatus according to an example embodiment of the present invention.

FIG. 5 is a block diagram of an example embodiment apparatus 505 according to the present invention. The apparatus 505 may be part of a system 500 and includes memory 510 storing program logic 515, a processor 520 for executing a process 525, and a communications I/O interface 530, connected via a bus 535. The exemplary apparatus 505 is discussed only for illustrative purpose and should not be construed as a limitation on the embodiments or scope of the present disclosure. In some cases, some devices may be added to or removed from a computer system based on specific situations. For example, a computer system may be representative of a standalone system or a system of a production site, which comprises a number of hosts coupled to a source disk and a target disk. In most embodiments, a system/device may comprise a processor and a memory, such as a laptop computer, personal digital assistant, or mobile phones.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

In some embodiments, the system may be performed by one or more programmable processors executing one or more computer programs to perform the functions of the system. In some other embodiments, all or part of the system may be implemented as special purpose logic circuitry (e.g., a field-programmable gate array (FPGA) and/or an application-specific integrated circuit (ASIC)). In some other embodiments, all or part of the system may be implemented using electronic hardware circuitry that include electronic devices such as, for example, at least one of a processor, a memory, a programmable logic device or a logic gate.

In one embodiment, the methods described herein are not limited to the specific examples described. In a further embodiment, rather, any of the method steps may be reordered, combined or removed, or performed in parallel or in serial, as necessary, to achieve the results set forth above.

In some embodiments, the system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). In certain embodiments, each such program may be implemented in a high level procedural or object-oriented programming language to communicate with a computer system. In certain other embodiments, however, the programs may be implemented in assembly or machine language. In some embodiments, the language may be a compiled or an interpreted language and it may be deployed in any form, including as a stand-alone program or as a module, component, subroutine, or other unit suitable for use in a computing environment. In some other embodiments, a computer program may be deployed to be executed on one computer or on multiple computers at one site or distributed across multiple sites and interconnected by a communication network.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 5, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine. In some other embodiment, a non-transitory machine-readable medium may include but is not limited to a hard drive, compact disc, flash memory, non-volatile memory, volatile memory, magnetic diskette and so forth but does not include a transitory signal per se.

Figure 6:
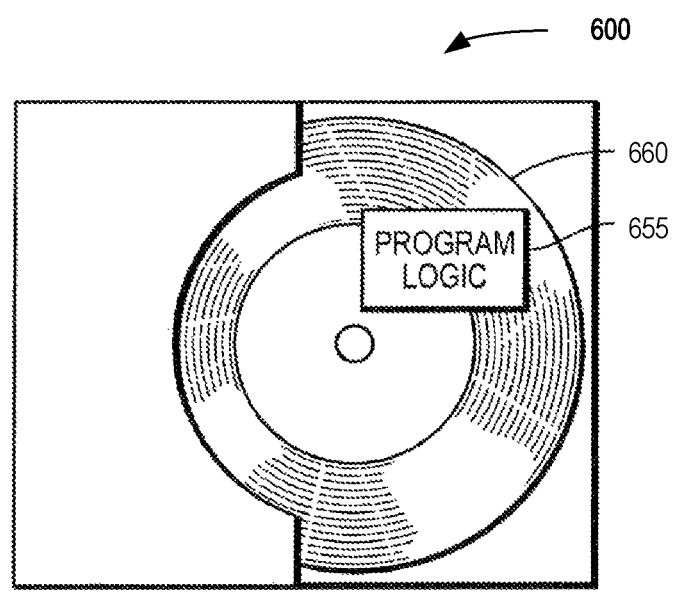
FIG. 6 is an illustrating of an example embodiment of the present invention as embodied in computer program code.

FIG. 6 is a block diagram of a computer program product 600 including program logic 655, encoded on a computer-readable medium 660 in computer-executable code configured for carrying out the methods of the invention, according to an example embodiment of the present invention. The logic for carrying out the method may be embodied as part of the aforementioned system, which is useful for carrying out a method described with reference to embodiments shown. In one embodiment, program logic 655 may be loaded into memory and executed by processor. In a further embodiment, program logic 655 may also be the same program logic 655 on a computer readable medium.

Various exemplary embodiments of the present disclosure have been described with reference to the accompanying drawings. It should be noted that all of these drawings and description are only presented as exemplary embodiments. It is to note that based on the subsequent description, alternative embodiments may be conceived that may have a structure and method disclosed as herein, and such alternative embodiments may be used without departing from the principle of the disclosure as claimed in the present disclosure.

It may be appreciated that these exemplary embodiments are provided only for enabling those skilled in the art to better understand and then further implement the present disclosure, not intended to limit the scope of the present disclosure in any manner. Besides, in the drawings, for a purpose of illustration, optional steps, modules, and units are illustrated in dotted-line blocks.

The terms "comprise(s)," "include(s)", their derivatives and like expressions used herein should be understood to be open, i.e., "comprising/including, but not limited to." The term "based on" means "at least in part based on." The term "one embodiment" means "at least one embodiment"; and the term "another embodiment" indicates "at least one further embodiment." Relevant definitions of other terms will be provided in the description below.

It may be noted that the flowcharts and block diagrams in the figures may illustrate the apparatus, method, as well as architecture, functions and operations executable by a computer program product according to various embodiments of the present disclosure. In this regard, each block in the flowcharts or block diagrams may represent a module, a program segment, or a part of code, which may contain one or more executable instructions for performing specified logic functions. It should be further noted that in some alternative implementations, functions indicated in blocks may occur in an order differing from the order as illustrated in the figures. For example, two blocks shown consecutively may be performed in parallel substantially or in an inverse order sometimes, which depends on the functions involved. It should be further noted that each block and a combination of blocks in the block diagrams or flowcharts may be implemented by a dedicated, hardware-based system for performing specified functions or operations or by a combination of dedicated hardware and computer instructions.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:
creating a current first snapshot of a volume at a current first time in a primary storage;
determining differences between the current first snapshot at the current first time and a previous second snapshot created at a previous second time; and
sending the differences between the current first snapshot and the previous second snapshot to a secondary storage;
deleting data from addresses in the volume in the primary storage of the differences sent to the secondary storage;
storing pointers to the secondary storage for the deleted addresses in a low tier node in a hierarchy of nodes storing data for the volume at the primary storage;
receiving a read request, including a read address, at the primary storage; and
recursively attempting to read the data from the read address from an active or a higher level node in the hierarchy of nodes storing data for the volume at the primary storage comprises:
attempting to read the data from the read address at the active node in the hierarchy of nodes storing data for the volume at the primary storage; and returning the data from the address if the data is stored at the address in the active node in the hierarchy of nodes storing data for the volume at the primary storage;

if the data is not stored at the address in the active node in the hierarchy of nodes storing data for the volume at the primary storage:

recursively attempting to read the data from the read address from the higher level node in the hierarchy of nodes storing data for the volume at the primary storage; and returning the data from the address if the data is stored at the address in the hierarchy of nodes storing data for the volume at the primary storage;

wherein storing pointers to the secondary storage for the deleted addresses in a low tier node comprises storing a first type of metadata indicating that the data was tiered to the secondary storage; and wherein recursively attempting to read the data from the read address from an active or a higher level node in the hierarchy of nodes comprises attempting to read from the higher level node in the hierarchy of nodes according to a second type of metadata indicating that read address in the active node is thin.

2. The method of claim 1 wherein deleting data from addresses in the volume in the primary storage of the differences sent to the secondary storage comprises determining data to delete from addresses in the volume in the primary storage according to a heatmap of read requests to the addresses.

3. The method of claim 1 further comprising:
receiving a write request, including data and a write address, at the primary storage;
storing data of the write request at the address in an active node of a hierarchy of nodes storing data for the volume at the primary storage.

4. The method of claim 1 further comprising:
receiving the differences between the current first snapshot and the previous second snapshot at the secondary storage; and
storing the differences in a third snapshot in the secondary storage.

5. A system comprising:
a primary storage;
a secondary storage; and
memory storing computer program code that when executed on a processor causes the processor to execute a replication process operable to perform the operations of:
creating a current first snapshot of a volume at a current first time in a primary storage;
determining differences between the current first snapshot at the current first time and a previous second snapshot created at a previous second time;
sending the differences between the current first snapshot and the previous second snapshot to a secondary storage;
deleting data from addresses in the volume in the primary storage of the differences sent to the secondary storage; and
storing pointers to the secondary storage for the deleted addresses in a low tier node in a hierarchy of nodes storing data for the volume at the primary storage;
receiving a read request, including a read address, at the primary storage;
recursively attempting to read the data from the read address from an active or a higher level node in the hierarchy of nodes storing data for the volume at the primary storage, the data from the read address from an active or a higher level node in the hierarchy of nodes storing data for the volume at the primary storage comprises computer program code operable to perform the operations of:
attempting to read the data from the read address at the active node in the hierarchy of nodes storing data for the volume at the primary storage; and
returning the data from the address if the data is stored at the address in the active node in the hierarchy of nodes storing data for the volume at the primary storage;
wherein the memory further stores computer program code operable to perform the operations of, if the data is not stored at the address in the hierarchy of nodes storing data for the volume at the primary storage:
recursively attempting to read the data from the read address from the higher level node in the hierarchy of nodes storing data for the volume at the primary storage; and
returning the data from the address if the data is stored at the address in the hierarchy of nodes storing data for the volume at the primary storage;
wherein the memory further stores computer program code operable to perform the operations of, if the data is not stored at the address in the hierarchy of nodes storing data for the volume at the primary storage:
examining the read address in the low tier node in the hierarchy of nodes storing data for the volume at the primary storage for a pointer to the secondary storage; and
if there is a pointer for the read address in the low tier node in the hierarchy of nodes storing data for the volume at the primary storage, attempting to read the data from the read address at the secondary storage according to the pointer;
wherein computer program code operable to perform the operation of storing pointers to the secondary storage for the deleted addresses in a low tier node comprises computer program code operable to perform the operation of storing a first type of metadata indicating that the data was tiered to the secondary storage; and
wherein computer program code operable to perform the operation of recursively attempting to read the data from the read address from an active or a higher level node in the hierarchy of nodes comprises computer program code operable to perform the operation of attempting to read from the higher level node in the hierarchy of nodes according to a second type of metadata indicating that read address in the active node is thin.

6. The system of claim 5 wherein computer program code operable to perform the operation of deleting data from addresses in the volume in the primary storage of the differences sent to the secondary storage comprises computer program code operable to perform the operation of determining data to delete from addresses in the volume in the primary storage according to a heatmap of read requests to the addresses.

7. The system of claim 5 wherein the memory further stores computer program code operable to perform the operations of:
receiving a write request, including data and a write address, at the primary storage;

storing data of the write request at the address in an active node of a hierarchy of nodes storing data for the volume at the primary storage.

8. The system of claim 5 wherein the memory further stores computer program code operable to perform the operations of:

receiving the differences between the current first snapshot and the previous second snapshot at the secondary storage; and storing the differences in a third snapshot in the secondary storage.

9. A computer program product including a non-transitory computer readable storage medium having computer program code encoded thereon that when executed on a processor of a computer causes the computer to execute a replication process comprising:

computer program code for creating a current first snapshot of a volume at a current first time in a primary storage;

computer program code for determining differences between the current first snapshot at the current first time and a previous second snapshot created at a previous second time;

computer program code for sending the differences between the current first snapshot and the previous second snapshot to a secondary storage;

deleting data from addresses in the volume in the primary storage of the differences sent to the secondary storage;

storing pointers to the secondary storage for the deleted addresses in a low tier node in a hierarchy of nodes storing data for the volume at the primary storage;

receiving a read request, including a read address, at the primary storage; and recursively attempting to read the data from the read address from an active or a higher level node in the hierarchy of nodes storing data for the volume at the primary storage comprises:

attempting to read the data from the read address at the active node in the hierarchy of nodes storing data for the volume at the primary storage; and returning the data from the address if the data is stored at the address in the active node in the hierarchy of nodes storing data for the volume at the primary storage;

if the data is not stored at the address in the active node in the hierarchy of nodes storing data for the volume at the primary storage:

recursively attempting to read the data from the read address from the higher level node in the hierarchy of nodes storing data for the volume at the primary storage; and returning the data from the address if the data is stored at the address in the hierarchy of nodes storing data for the volume at the primary storage;

wherein storing pointers to the secondary storage for the deleted addresses in a low tier node comprises storing a first type of metadata indicating that the data was tiered to the secondary storage; and wherein recursively attempting to read the data from the read address from an active or a higher level node in the hierarchy of nodes comprises attempting to read from the higher level node in the hierarchy of nodes according to a second type of metadata indicating that read address in the active node is thin.

10. The computer program product of claim 9 wherein deleting data from addresses in the volume in the primary storage of the differences sent to the secondary storage comprises determining data to delete from addresses in the volume in the primary storage according to a heatmap of read requests to the addresses.

11. The computer program product of claim 9 further comprising:

receiving a write request, including data and a write address, at the primary storage;

storing data of the write request at the address in an active node a hierarchy of nodes storing data for the volume at the primary storage.

12. The computer program product of claim 9, further comprising:

receiving the differences between the current first snapshot and the previous second snapshot at the secondary storage; and storing the differences in a third snapshot in the secondary storage.

* * * * *